United States Patent
Hemphill

(10) Patent No.: US 9,017,212 B2
(45) Date of Patent: Apr. 28, 2015

(54) WEDGE ONE-WAY CLUTCH WITH GEAR THRUST ACTIVATION

(71) Applicant: Schaeffler Technologies GmbH & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/282,637

(22) Filed: May 20, 2014

(65) Prior Publication Data

US 2014/0353107 A1    Dec. 4, 2014

Related U.S. Application Data

(60) Provisional application No. 61/828,045, filed on May 28, 2013.

(51) Int. Cl.
*F16D 41/00* (2006.01)
*F16D 41/061* (2006.01)
*F16H 1/08* (2006.01)

(52) U.S. Cl.
CPC .............. *F16D 41/00* (2013.01); *F16D 41/061* (2013.01); *F16H 1/08* (2013.01)

(58) Field of Classification Search
CPC .................................. F16D 41/061; F16H 1/08
USPC ......................................................... 192/54.51
See application file for complete search history.

(56) References Cited

U.S. PATENT DOCUMENTS

| 4,226,310 | A | 10/1980 | Ozaki |
| 5,018,611 | A | 5/1991 | Hasebe |
| 5,964,332 | A * | 10/1999 | King ............................. 192/64 |
| 6,206,161 | B1 * | 3/2001 | Ross ......................... 192/48.91 |
| 6,422,371 | B1 * | 7/2002 | Naraki et al. ............. 192/105 C |
| 8,306,709 | B2 | 11/2012 | Lee et al. |
| 2009/0005212 | A1 * | 1/2009 | Maguire et al. ............... 475/323 |
| 2009/0159390 | A1 | 6/2009 | Davis |

FOREIGN PATENT DOCUMENTS

JP    2000227128 A    8/2000

* cited by examiner

*Primary Examiner* — Justin Holmes
*Assistant Examiner* — David Morris
(74) *Attorney, Agent, or Firm* — Simpson & Simpson, PLLC

(57) ABSTRACT

A clutch assembly, including: a one-way clutch connected to first and second components and a helical gear engaged with the one way clutch. The helical gear is arranged to rotate in a rotational direction such that the helical gear displaces in an axial direction. The displacement of the helical gear in the axial direction and rotation of the helical gear in the rotational direction are arranged to rotationally lock the one-way clutch to non-rotatably connect the first and second components.

15 Claims, 5 Drawing Sheets

WEDGE ONE-WAY CLUTCH WITH GEAR THRUST ACTIVATION

CROSS-REFERENCE TO RELATED APPLICATION

This application claims the benefit under 35 U.S.C. §119 (e) of U.S. Provisional Application No. 61/828,045, filed May 28, 2013, which application is incorporated herein by reference in its entirety.

TECHNICAL FIELD

The present disclosure relates to a clutch assembly including a friction clutch and a parallel wedge one-way clutch activated by thrust from a helical gear. The wedge one-way clutch includes a pair of axially displaceable outer races and a wedge plate and inner race with complimentary ramps.

BACKGROUND

FIG. 5 is a partial side view of an interior of a prior art transmission 200. Transmission 200 includes casing 202, clutch 204 and planetary gear set 206. Clutch 204 includes inner carrier 208 and clutch plates 210 non-rotatably connected to casing 202 or carrier 208 and axially displaceable with respect to casing 202 and carrier 208. Gear set 206 includes planet gear 212 and carrier/pin 214. As part of the operation of transmission 200, a component of the gear set, for example, carrier/pin 214 is grounded (non-rotatably connected) to casing 202. Plate 216 is non-rotatably connected to the component of the gear set, for example, carrier/pin 214. To ground carrier/pin 214, clutch 204 is closed, for example, by axially displacing pressure plate 218 to engage the clutch plates such that carrier 208, plate 216 and carrier/pin 214 are non-rotatably connected to the casing. Thus, operation of transmission 200, involves clutch 204 being closed for one gear of the transmission and being open for another gear of the transmission. Ideally, the transition between the open and closed states for clutch 204 should be completed as quickly and smoothly as possible. However, given the complication of operating clutch 204, for example, pressurizing an apply chamber, displacing an actuation device to displace plate 218, and axially engaging the clutch plates, it is difficult to operate clutch 204 to ensure a smooth and comfortable gear shift.

It is known to use a roller or sprag one-way clutch with a clutch similar to clutch 204 in conjunction with grounding a gear component for a transmission gear shift. However, due to the high speeds associated with rotation of gears in the transmission (for example, up to 15,000 rpm), centrifugal forces become so large that components of the roller or sprag one-way clutch, such as cages or springs, deform, impairing operation of the roller or sprag one-way clutch, or even rendering the roller or sprag one-way clutch inoperable. In addition, roller and sprag one-way clutches introduce undesirable drag during free-wheel mode.

SUMMARY

According to aspects illustrated herein, there is provided a clutch assembly, including: a one-way clutch connected to first and second components and a helical gear engaged with the one way clutch. The helical gear is arranged to rotate in a rotational direction such that the helical gear displaces in an axial direction. The displacement of the helical gear in the axial direction and rotation of the helical gear in the rotational direction are arranged to rotationally lock the one-way clutch to non-rotatably connect the first and second components.

According to aspects illustrated herein, there is provided a clutch assembly, including: a one-way clutch with an inner race non-rotatably connected to a first component, first and second outer races non-rotatably connected to a second component, and a wedge plate radially disposed between the inner race and the first and second outer races; a helical gear; and an actuation plate engaged with the first component. The helical gear is arranged to rotate in a rotational direction such that the helical gear displaces in an axial direction. The displacement of the helical gear in the axial direction is arranged to displace the actuation plate and the first outer race in the axial direction to engage the wedge plate with the first and second outer races. The rotation of the helical gear in the rotational direction is arranged to rotate the inner race with respect to the wedge plate to non-rotatably connect the inner race with the first and second outer races.

According to aspects illustrated herein, there is provided a clutch assembly, including: a one-way clutch with an inner race non-rotatably connected to a first component, first and second outer races non-rotatably connected to a housing for a transmission, and a wedge plate radially disposed between the inner race and the first and second outer races; a helical gear for a planetary gear set in the transmission; and an actuation plate engaged with the first component. The entirety of the wedge plate is radially aligned with the inner race. The helical gear is arranged to rotate in a rotational direction such that the helical gear displaces in an axial direction. The displacement of the helical gear in the axial direction is arranged to displace the actuation plate and the first outer race in the axial direction to clamp the wedge plate with the first and second outer races. The rotation of the helical gear in the rotational direction is arranged to rotate the inner race with respect to the wedge plate to non-rotatably connect the wedge plate with the inner race and the first and second outer races.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
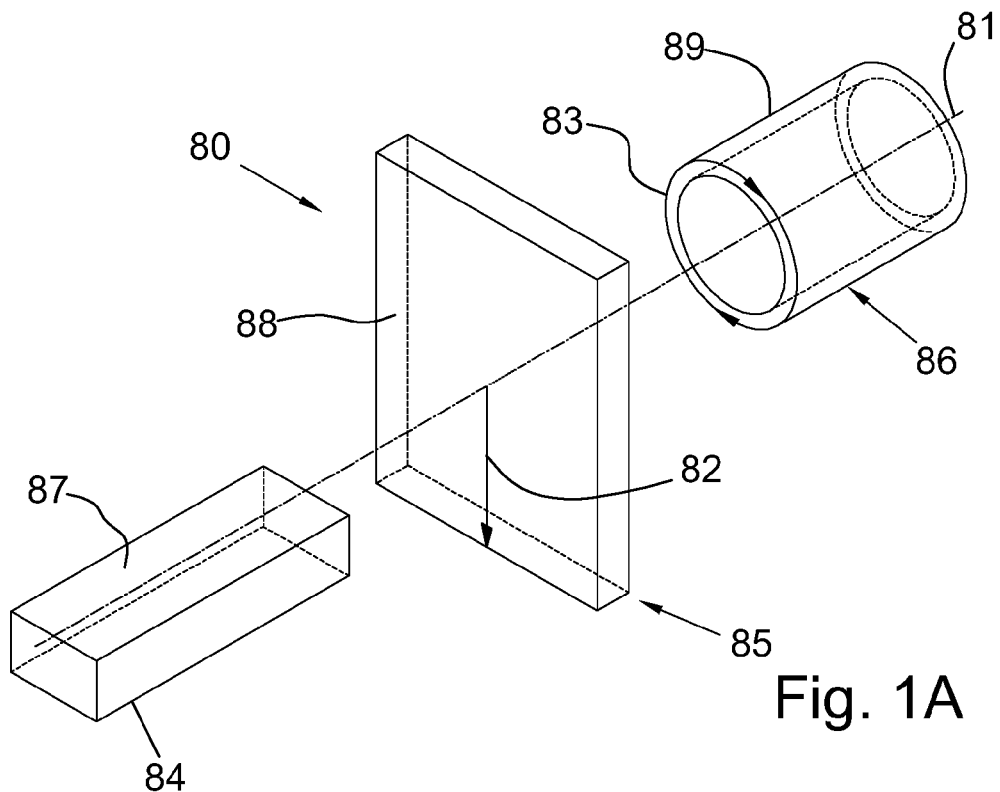
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
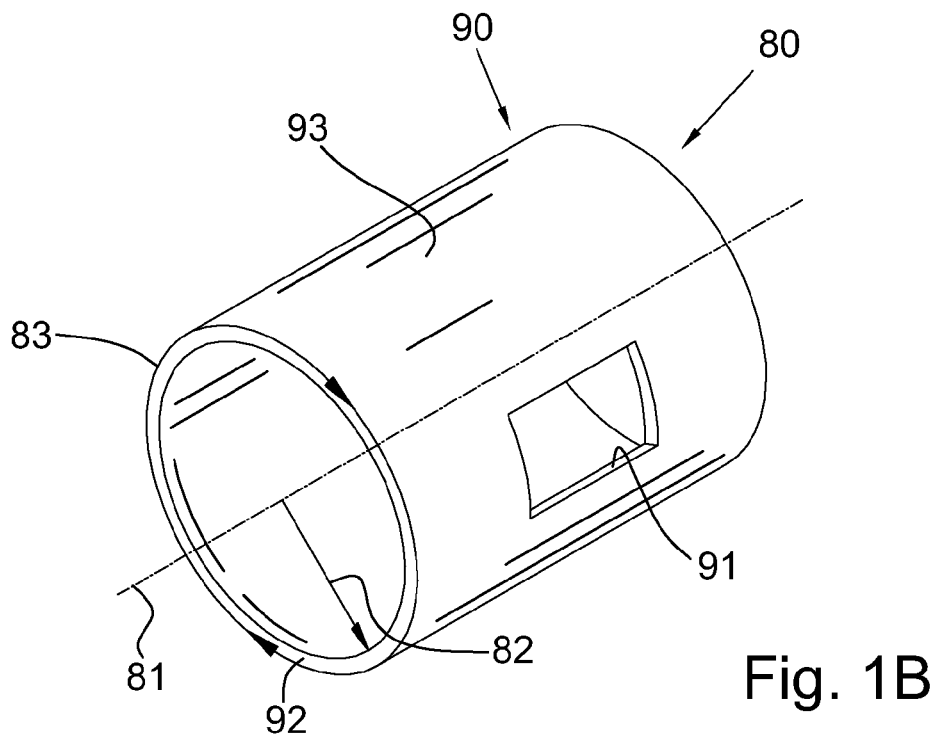
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
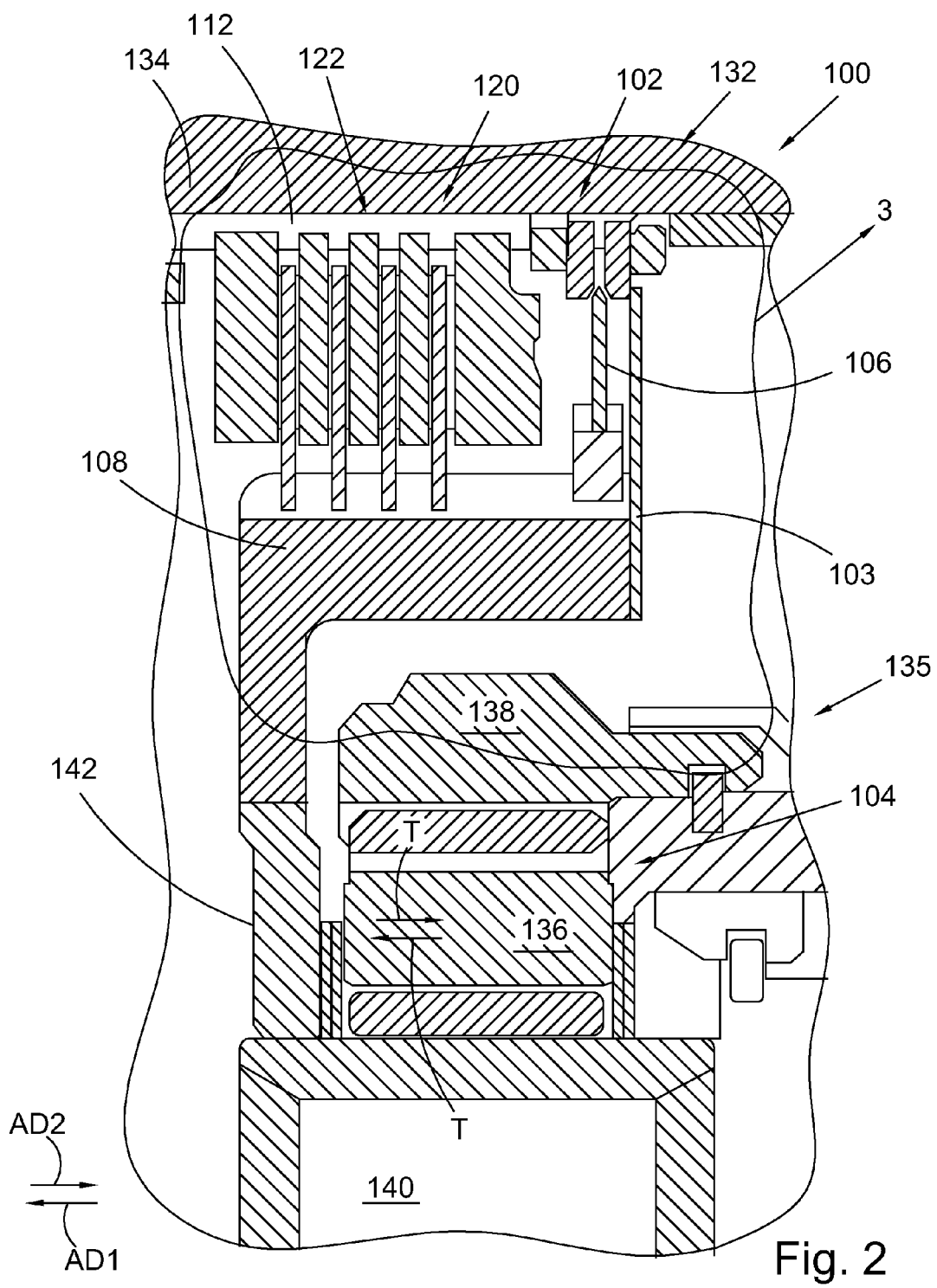
FIG. 2 is a partial side view of an interior of a torque transmission device including a one-way clutch, with gear thrust activation, in a free-wheel mode.

FIG. 2 is a partial side view of an interior of a torque transmission device including a one-way clutch, with gear thrust activation, in a free-wheel mode.

Figure 3:
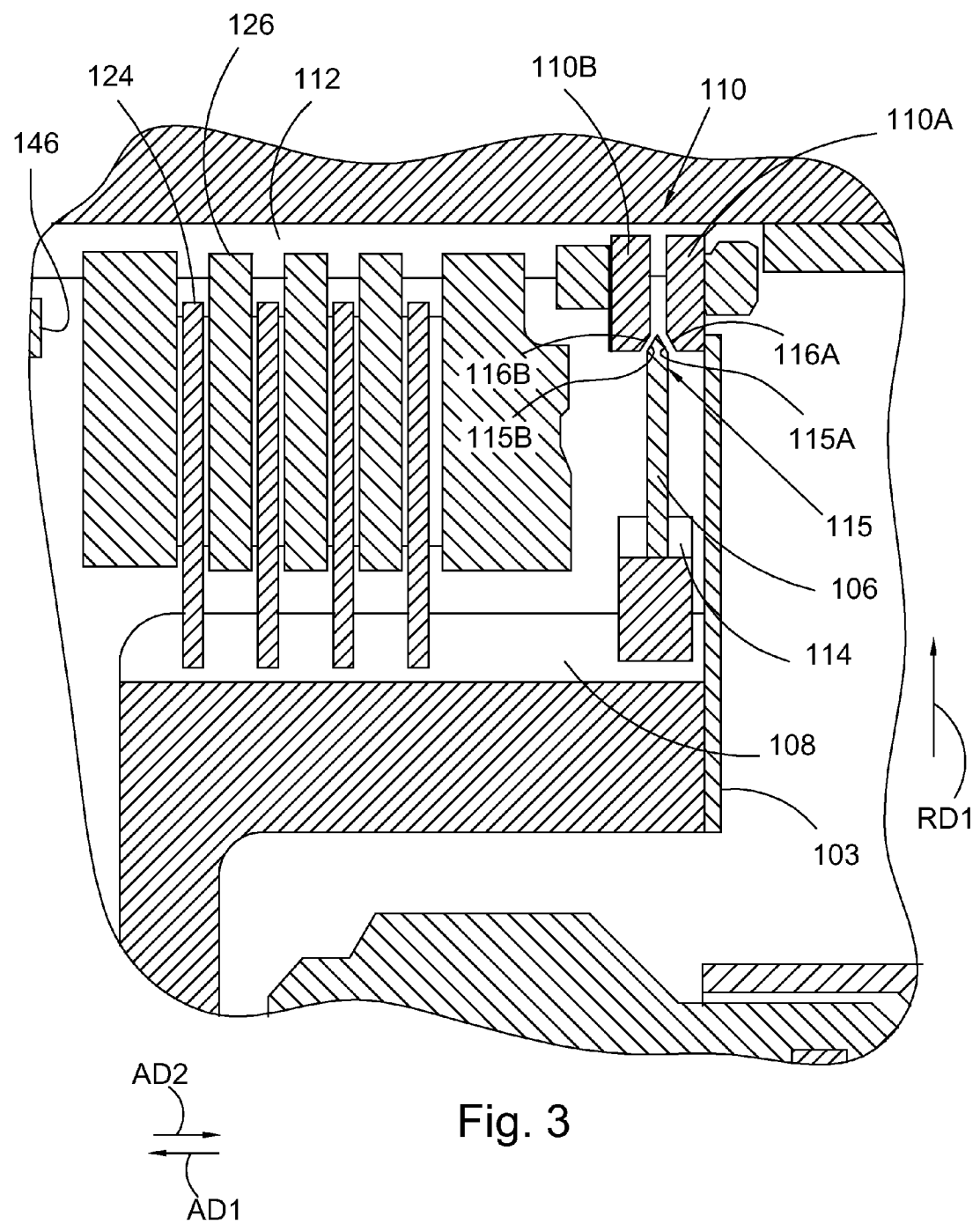
FIG. 3 is a detail of area 3 of FIG. 2.

FIG. 3 is a detail of area 3 of FIG. 2. The following should be viewed in light of FIGS. 2 and 3. Clutch assembly 100 includes one-way clutch 102, actuator plate 103, and helical gear 104 engaged with plate 103. One-way clutch 102 includes wedge plate 106, component 108, and outer races 110A and 110B non-rotatably connected to component 112. Plate 103 is non-rotatably connected to component 108. Race 110A is axially displaceable with respect to component 112. In an example embodiment, the one-way clutch includes inner race 114 non-rotatably connected to component 108 and axially displaceable with respect to component 108. In an example embodiment, race 114 is fixed to component 108 and wedge plate 106 is axially displaceable with respect to race 114.

As is known in the art, a helical gear produces thrust, along an axis of rotation for the helical gear, in response to rotation of the helical gear. The axial direction of the thrust depends on the direction of rotation. That is, rotation in one direction causes thrust in one axial direction and rotation in an opposite direction causes thrust in an opposite axial direction. For rotation of the helical gear in one rotational direction, thrust T from the helical gear is arranged to displace the helical gear in axial direction AD1 to rotationally lock the one-way clutch (locking mode) to non-rotatably connect components 108 and 112. For example, thrust T is arranged to displace outer race 110A in axial direction AD1. As further described below, the displacement of helical gear 104 in axial direction AD1 and rotation of helical gear 104 in the rotational direction are arranged to rotationally lock one-way clutch 110 to non-rotatably connect the components 108 and 112. More specifically, the displacement of helical gear 104 in axial direction AD1 is arranged to displace actuation plate 103 and outer race 110A in axial direction AD1 to engage, or clamp, wedge plate 106 with outer races and the rotation of helical gear 104 in the rotational direction is arranged to rotate component 108 with respect to component 112 to non-rotatably connect wedge plate 106 with the inner race 114 and outer races 110A and 110B. By "clamp" we mean that the outer races contact the wedge plate to slow or prevent rotation of the wedge plate with respect to the outer races.

For rotation of the helical gear in an opposite rotational direction, thrust T from the helical gear is reversed (is directed in axial direction AD2) and arranged to displace gear 104 in direction AD2 such that outer races 110A and 110B sufficiently disengage from wedge 106 to open clutch 102 and clutch 102 operates in a free-wheel mode minimal drag. That is, wedge plate 106 has minimal or no contact with races 110A and 110B and wedge plate 106 and component 108 are freely rotatable with respect to races 110A/110B and component 112.

In an example embodiment, the wedge plate includes radially outermost surface 115 including portions 115A and 115B tapering toward each other in radially outward direction RD1. In an example embodiment, outer races 110A and 110B include surfaces 116A and 116B, respectively, substantially parallel to portions 115A and 115B, respectively. Outer race 110A is displaceable in axial direction AD1 to non-rotatably connect portion 115A with surface 116A, and portion 115B with surface 116B.

Figure 4:
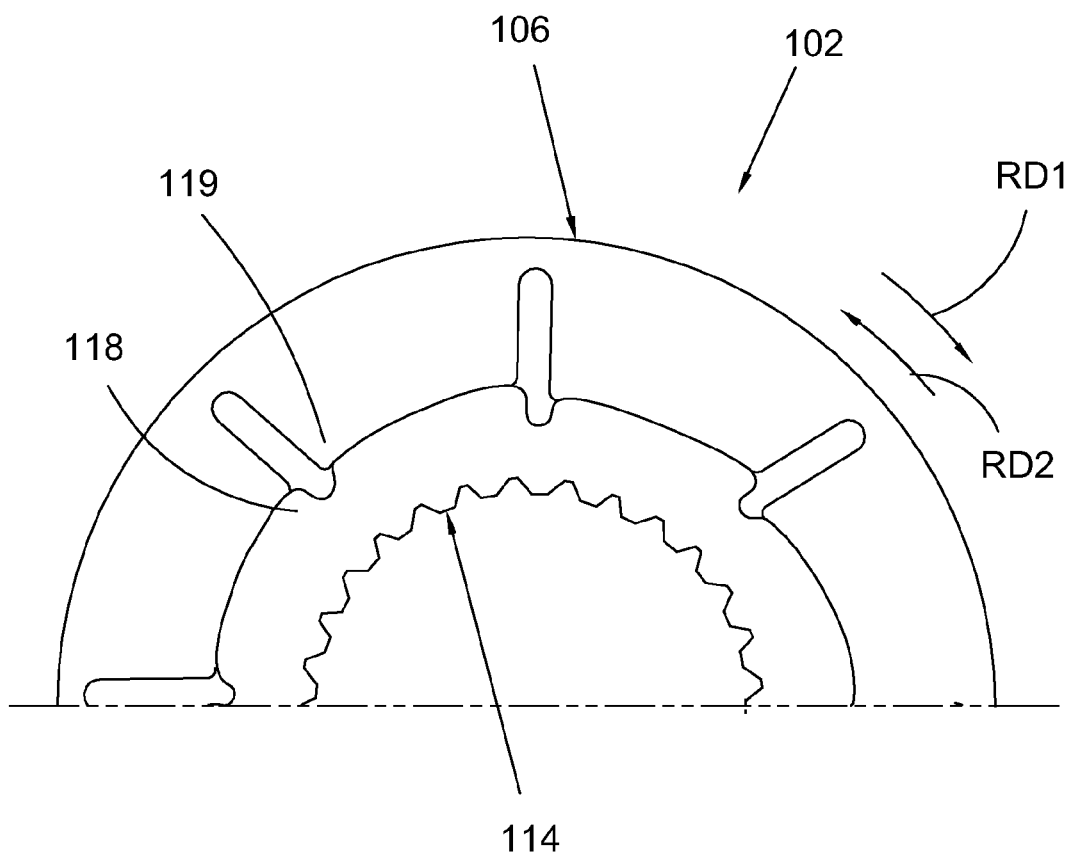
FIG. 4 is a partial front view of the inner race and wedge plate in FIG. 2; and, FIG. 5 is a partial side view of an interior of a prior art transmission.
Figure 5:
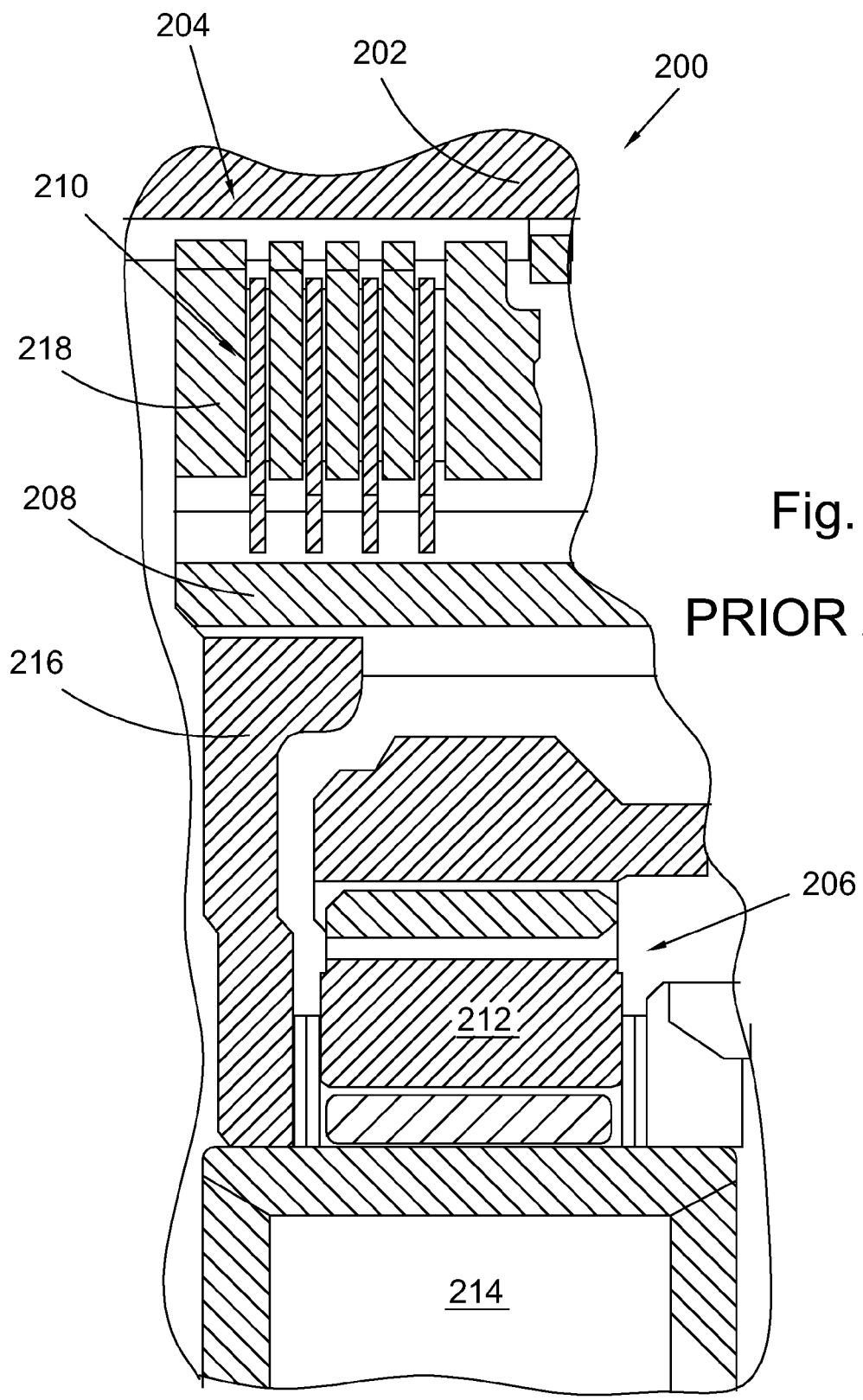

FIG. 4 is a partial front view of the inner race and wedge plate in FIG. 2. The following should be viewed in light of FIGS. 2 through 4. In an example embodiment, inner race 114 includes radially outwardly extending ramps 118 and wedge plate 106 includes radially inwardly extending ramps 119 engageable with radially outwardly extending ramps 118. In the free-wheel mode, nominal contact of ramps 118 and 119 coupled with the nominal or lack of contact between wedge plate 106 and the outer races, causes wedge plate 106 to rotate with the inner race. For example, the inner race and wedge plate rotate in direction RD1 with respect to the outer race.

For the locking mode, the axial displacement of actuation plate 103 is arranged to displace outer race 110A in axial direction AD1 to engage portions 116A/B and surfaces 118A/B, respectively, such the wedge plate is rotationally fixed by the contact of portions 116A/B and surfaces 118A/B or the rotation of the wedge plate is blocked, or opposed, by the contact of portions 116A/B and surfaces 118A/B. The rotation of helical gear 104 and component 108 causes inner race 114 to rotate, for example, in rotational direction RD2 with respect to the wedge plate. As a result of the rotation of race 114, outwardly extending ramps 118 slide across inwardly extending ramps 119 and ramps 118 urge the wedge plate radially outward to non-rotatably connect inner race 114 with outer races 110A and 110B. As torque from the rotation of gear 104 and component 108 increases, further radially outward force is applied to wedge plate 106, increasing the non-rotational connection of the inner and outer races and increasing the torque-carrying capacity of clutch 102.

In an example embodiment, assembly 100 includes friction clutch 120 and components 108 and 112 are inner and outer carriers, respectively, for clutch 120. Clutch 120 includes clutch plates 122 non-rotatably connected to the inner or outer carrier, and axially displaceable with respect to the inner or outer carriers. In an example embodiment, clutch plates 122 include friction plates 124 non-rotatably connected to one of the inner or outer carriers, and pressure plates 126 non-rotatably connected to the other of the inner or outer carriers. In an example embodiment, plates 124 are non-rotatably connected to the inner carrier and plates 126 are non-rotatably connected to the outer carrier. It should be understood that this configuration can be reversed. In an example embodiment, operation of one-way clutch 102 is independent of operation of clutch 120.

In an example embodiment, clutch 100 is part of transmission 132 and outer carrier 112 is non-rotatably connected to casing 134 for the transmission. In an example embodiment, the outer carrier is integral with the casing. In an example embodiment, helical gear 104 is part of planetary gear set 135, for example for a first forward gear, and includes planet gear 136 engaged with ring gear 138, and pin 140 and planetary carrier 142 non-rotatably connected to component 108. The following provides further detail regarding exemplary operation of clutch 100 in the transmission. Clutch 120 is not normally used for drive, for example for D on a shifter, but can be engaged in a lower gear to bypass the freewheel function of one-way clutch 102 during deceleration in the lower gear, that is, to provide engine braking The bypass function is typically not used in normal driving due to a lurching feeling that results, similar to the effect of alternating the gas pedal on-and-off with a manual transmission in first gear. One-way clutch 102 enables freewheeling during deceleration to disconnect the engine, making the maneuver more comfortable.

When clutch 122 is used for first gear, torque on one-way clutch 102 is modulated by a friction clutch for second gear (not shown). That is, torque is transmitted to one-way clutch 102 only when the second gear clutch slips. This is true for upshifts and downshifts. For example, during an upshift, as the second gear clutch engages, torque passes from one-way clutch 102 to the second gear clutch until there is no more torque on one-way clutch 102 and all torque is transmitted through the second gear clutch. During a downshift, as the second gear clutch starts slipping, one-way clutch 102 starts carrying the torque. If the second gear clutch is abruptly released during a drive downshift, for example, a "kick-down" during hard acceleration, the shift would be harsh because there is no modulation in the one-way clutch. As long as the clutch is gradually disengaged, the shift is comfortable.

In general, clutch pack and gear train drag, as well as inertial forces from component speed changes, are enough to provide a minimal thrust load from the helical gear to clamp one-way clutch 102 to start the engagement of one-way clutch 102.

In an example embodiment, friction clutch 120 includes piston element 146 displaceable in axial direction AD2 to axially displace clutch plates 122, independent of the operation of the helical gear, to close clutch 120 and non-rotatably connect carriers 108 and 112.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A clutch assembly, comprising:
a one-way clutch connected to first and second components; and,
a helical gear engaged with the one way clutch, wherein:
the helical gear is arranged to rotate in a rotational direction such that the helical gear displaces in an axial direction; and,
the displacement of the helical gear in the axial direction and rotation of the helical gear in the rotational direction are arranged to rotationally lock the one-way clutch to non-rotatably connect the first and second components.

2. The clutch assembly of claim 1, further comprising:
an actuation plate axially displaceable by the first component, wherein:
the one-way clutch includes:
an inner race non-rotatably connected to the first component;
first and second outer races non-rotatably connected to the second component; and,
a wedge plate radially disposed between the inner race and the first and second outer races;
the displacement of the helical gear in the axial direction is arranged to displace the first component and the actuation plate to clamp the wedge plate with the first and second outer races; and,
the rotation of the helical gear in the rotational direction is arranged to rotate the inner race and the first component to non-rotatably connect the wedge plate with the inner race and the first and second outer races.

3. The clutch assembly of claim 2, wherein:
the first and second outer races are non-rotatably connected to a housing for a transmission;
the transmission includes a planetary gear set; and,
the helical gear is included in the planetary gear set.

4. The clutch assembly of claim 2, wherein:
the inner race includes a plurality of radially outwardly extending ramps;
the wedge plate includes:
a plurality of radially inwardly extending ramps engagable with the plurality of radially outwardly extending ramps; and,
a radially outermost surface including first and second portions tapering toward each other in a radially outward direction; and,
the first and second outer races include first and second surfaces, respectively, substantially parallel to the first and second portions, respectively, wherein:
the displacement of the helical gear in the axial direction is arranged to displace the first outer race in the axial direction to engage the first portion and the first surface, and the second portion and the second surface such that the inner race rotates with respect to the wedge plate; and,
the rotation of the helical gear in the rotational direction is arranged to slide the plurality of radially outwardly extending ramps across the plurality of radially inwardly extending ramps such that the plurality of radially outwardly extending ramps urges the wedge plate radially outward to non-rotatably connect the inner race with the first and second outer races.

5. The clutch assembly of claim 1, further comprising:
a friction clutch including: an inner carrier; an outer carrier; and a plurality of clutch plates non-rotatably connected to the inner or outer carriers and axially displaceable with respect to the inner and outer carriers, wherein:
the first component includes the inner carrier; and,
the second component includes the outer carrier.

6. The clutch assembly of claim 5, wherein:
the plurality of clutch plates includes:
a plurality of friction plates non-rotatably connected to one of the inner or outer carriers; and,
a plurality of pressure plates non-rotatably connected to the other of the inner or outer carriers; and,
the displacement of the helical gear in the axial direction and rotation of the helical gear in the rotational direction are arranged to rotationally lock the one-way clutch to non-rotatably connect the inner and outer carriers while the plurality of friction plates is rotatable with respect to the plurality of pressure plates.

7. The clutch assembly of claim 5, wherein the friction clutch includes a piston element arranged to axially displace the plurality of clutch plates, independent of the operation of the helical gear, to non-rotatably connect the inner and outer carriers.

8. A clutch assembly, comprising:
a one-way clutch including:
an inner race non-rotatably connected to a first component;
first and second outer races non-rotatably connected to a second component; and,
a wedge plate radially disposed between the inner race and the first and second outer races;
a helical gear; and,
an actuation plate engaged with the first component, wherein:
the helical gear is arranged to rotate in a rotational direction such that the helical gear displaces in an axial direction;
the displacement of the helical gear in the axial direction is arranged to displace the actuation plate and the first outer race in the axial direction to engage the wedge plate with the first and second outer races; and,
the rotation of the helical gear in the rotational direction is arranged to rotate the inner race with respect to the wedge plate to non-rotatably connect the inner race with the first and second outer races.

9. The clutch assembly of claim 8, wherein:
the inner race includes a first plurality of radially extending ramps;
the wedge plate includes a second plurality of radially extending ramps;
the displacement of the helical gear in the axial direction is arranged to enable relative rotation of the inner race with respect to the wedge plate; and,
the rotation of the helical gear in the rotational direction is arranged to slide the first plurality of radially extending ramps across the second plurality of radially extending ramps such that the first plurality of radially extending ramps urges the wedge plate radially outward to non-rotatably connect the inner race with the first and second outer races.

10. The clutch assembly of claim 8, wherein:
the first and second outer races are non-rotatably connected to a housing for a transmission;
the transmission includes a planetary gear set; and,
the helical gear is included in the planetary gear set.

11. The clutch assembly of claim 10, wherein the friction clutch includes a piston element arranged to axially displace the plurality of clutch plates, independent of the operation of the helical gear, to non-rotatably connect the inner and outer carriers.

12. The clutch assembly of claim 8, further comprising:
a friction clutch including:
an inner carrier;
an outer carrier;
a plurality of friction plates non-rotatably connected to one of the inner or outer carriers; and,
a plurality of pressure plates non-rotatably connected to the other of the inner or outer carriers, wherein:
the first and second components include the inner and outer carriers, respectively; and,
the displacement of the helical gear in the axial direction and rotation of the helical gear in the rotational direction are arranged to rotationally lock the one-way clutch to non-rotatably connect the inner and outer carriers while the plurality of friction plates is rotatable with respect to the plurality of pressure plates.

13. A clutch assembly, comprising:
a one-way clutch including:
an inner race non-rotatably connected to a first component;
first and second outer races non-rotatably connected to a housing for a transmission; and,
a wedge plate radially disposed between the inner race and the first and second outer races;
a helical gear for a planetary gear set in the transmission; and,
an actuation plate engaged with the first component, wherein:
the entirety of the wedge plate is radially aligned with the inner race;
the helical gear is arranged to rotate in a rotational direction such that the helical gear displaces in an axial direction;
the displacement of the helical gear in the axial direction is arranged to displace the actuation plate and the first outer race in the axial direction to clamp the wedge plate with the first and second outer races; and,
the rotation of the helical gear in the rotational direction is arranged to rotate the inner race with respect to the wedge plate to non-rotatably connect the wedge plate with the inner race and the first and second outer races.

14. The clutch assembly of claim 13, wherein:
the inner race includes a plurality of radially outwardly extending ramps;
the wedge plate includes:
a plurality of radially inwardly extending ramps engaged with the plurality of radially outwardly extending ramps; and,
a radially outermost surface including first and second portions tapering toward each other in a radially outward direction; and,
the first and second outer races include first and second surfaces, respectively, substantially parallel to the first and second portions, respectively, wherein:
the displacement of the helical gear in the axial direction is arranged to displace the first outer race in the axial direction to engage the first and second portions with the first and second surfaces, respectively, such that rotation of the wedge plate is at least partially blocked; and, the rotation of the helical gear in the rotational direction is arranged to slide the plurality of radially outwardly extending ramps across the plurality of radially inwardly extending ramps such that the plurality of radially outwardly extending ramps urges the wedge plate radially outward to non-rotatably connect the wedge plate with the inner race with the first and second outer races.

15. The clutch assembly of claim 13, further comprising:
a friction clutch including an inner carrier and a plurality of clutch plates non-rotatably connected to the inner carrier or the transmission housing and axially displaceable with respect to the inner carrier and the transmission housing, wherein:
the first component includes the inner carrier.

* * * * *